United States Patent [19]

Trudeau

[11] Patent Number: 4,700,804
[45] Date of Patent: Oct. 20, 1987

[54] SEISMIC ENERGY SOURCE
[75] Inventor: Curtis A. Trudeau, Elk Point, S. Dak.
[73] Assignee: CMI Corporation, Oklahoma City, Okla.
[21] Appl. No.: 814,739
[22] Filed: Dec. 30, 1985
[51] Int. Cl.$^4$ .............................................. G01V 1/04
[52] U.S. Cl. ..................................... 181/121; 181/119
[58] Field of Search .................. 73/665; 181/107, 113, 181/114, 119, 121; 367/143, 189, 190; 405/79, 271

[56] References Cited

U.S. PATENT DOCUMENTS

| | | | |
|---|---|---|---|
| 3,130,809 | 4/1964 | Flatow | 181/119 |
| 3,209,854 | 10/1965 | Williams | 181/119 |
| 3,283,845 | 11/1966 | Kenney | 181/119 |
| 3,283,846 | 11/1966 | Lindall et al. | 181/119 |
| 3,363,720 | 1/1968 | Mifsud et al. | 181/114 |
| 3,828,891 | 8/1974 | Eisner | 367/189 |
| 3,840,909 | 10/1974 | Silverman | 181/119 |
| 3,995,713 | 12/1976 | Hearn | 181/114 |
| 4,006,795 | 2/1977 | Anstey | 181/121 |
| 4,011,924 | 3/1977 | Barbier | 181/121 |
| 4,106,586 | 8/1978 | Stafford | 181/121 |
| 4,147,228 | 4/1979 | Bouyoucos | 181/119 |
| 4,303,141 | 12/1981 | Pascouet | 367/146 |
| 4,402,381 | 9/1983 | Airhart | 181/114 |

FOREIGN PATENT DOCUMENTS 1163289 6/1985 U.S.S.R. .............................. 181/119

Primary Examiner—Deborah L. Kyle
Assistant Examiner—Brian S. Steinberger
Attorney, Agent, or Firm—Dunlap, Codding & Peterson

[57] ABSTRACT

A hydraulically controlled seismic energy source for impressing individual seismic energy pulses into the ground, wherein the hydraulic pressure forcing the ram downwardly is substantially reduced slightly before the ram contacts the ground, and a continual upward hydraulic force is applied to a downwardly facing surface of the ram, whereby the ram is quickly removed from the ground after a seismic impulse is generated to prevent secondary contact between the ram and the ground.

9 Claims, 2 Drawing Figures

SEISMIC ENERGY SOURCE

FIELD OF THE INVENTION

This invention relates to seismic energy sources for developing a single seismic impulse in earth formations and more particularly, to seismic energy sources utilizing a hydraulic accelerating system in which the character of the seismic impulse generated in the earth can be controlled.

BACKGROUND OF THE PRESENT INVENTION

Seismic exploration typically involves use of a seismic energy source for generating an input of seismic energy into the earth formations and detection of the seismic energy reflections from subsurface strata at one or more spaced geophone stations. If the energy source is used to generate a single impulse of energy, such as a Ricker Wavelet, then the exclusion of subsequent cycles of energy input from the energy source is desirable. However, mechanical seismic energy sources which utilize dropping a weight are difficult to control and are slow in operation. Hydraulic systems which accelerate a weight as an impulse source are more efficient, but, in the past, have not effectively eliminated additional shock waves from the energy source following an initial shock or seismic impulse.

Heretofore, a hydraulically accelerated weight system has been developed as an inexpensive source of a seismic impulse energy. In this system, a weight or mass is accelerated by a hydraulic pressure source to contact the earths surface with sufficient force to obtain seismic reflections from subsurface strata in the shallow to medium depths. The system, aside from being simple and inexpensive, can operate repeatedly several thousand times a day without breakdowns or surface damage. The system can be mounted on a movable vehicle which is capable of getting in and out of places that other sources would have difficulty in operating.

The present invention is concerned with improvements for such a hydraulic accelerated weight system for creating a controlled seismic impulse and eliminating an subsequent "after shock" of an accelerated weight after an initial impact with the surface of the earth.

DESCRIPTION OF THE PRESENT INVENTION

The system in which the present invention is embodied includes a ram member which has a base plate and which is slidably and sealingly received in a vertically disposed ram cylinder. The ram member is initially in an upper position in the ram cylinder and is accelerated in a downward direction by the application of hydraulic fluid under pressure from a primary accumulator to a ram piston on the ram member where the hydraulic fluid is at a first actuation pressure in the primary accumulator. When the base member is accelerated to a first location just above a ground surface, the volume of hydraulic fluid in the primary accumulator is completely transferred to the ram cylinder by the first actuation pressure.

During the downward travel of the ram member, hydraulic fluid under the ram piston is used to develop a first return pressure in a system accumulator. When the first location is passed by the ram member by virtue of the accelerated weight of the ram member, the ram member thereafter contacts the earth's surface and compresses the earth formations producing a seismic impulse. As the base plate on the ram member is decelerated in compressing the earth formations, a reaction force is developed in the compressed earth formations. At the same time, a secondary accumulator connected to the ram cylinder above the ram piston provides a low pressure expansion chamber so that the reaction force in the earth formations can accelerate the ram member in an upward direction after the earth formations are compressed until the hydraulic fluid capacity of the secondary accumulator is reached. The hydraulic fluid capacity of the secondary accumulator is such that from the point of zero acceleration in the compressed earth formations, the ram member is accelerated upwardly a distance of several inches above the ground surface. The return pressure from the system accumulator is applied below the ram piston on the return stroke of the ram member to continue return of the ram member to its initial position.

The structure includes a valve means between a pump, the primary and secondary accumulators and the system accumulator in which the pump is utilized to supply a system pressure to each of the accumulators which is then isolated in the accumulators. At this point, the system accumulator and the primary accumulator have a positive stored differential pressure which is initially about the same value.

Next, the valve means are actuated to apply the positive stored pressure differential in the primary accumulator to the ram member which accelerates the ram member in a downward direction and hydraulic fluid under the ram piston is supplied to the system accumulator to increase the positive pressure differential in the system accumulator. When the ram member passes the first location just above the ground surface the pressure differential in the primary accumulator is disabled from effecting the ram member. This is accomplished by displacing all of the hydraulic fluid in the primary accumulator into the chamber above the ram piston. Further downward travel of the ram member draws hydraulic fluid from the secondary accumulator and the negative pressure differential across the secondary accumulator is reversed so that the pressure acting on a piston in the secondary accumulator is relatively low as compared to pressure developed by the reaction force from the earth formations. Thereafter, the reaction force develops an upward acceleration and hydraulic fluid from the chamber above the ram piston is received by the secondary accumulator until the reversed pressure differential in the secondary accumulator is overcome. At the same time, the system accumulator applies a return pressure developed during the downward stroke of the ram member to the ram piston to move the ram member to its initial position.

DESCRIPTION OF THE PRESENT INVENTION

Figure 1:
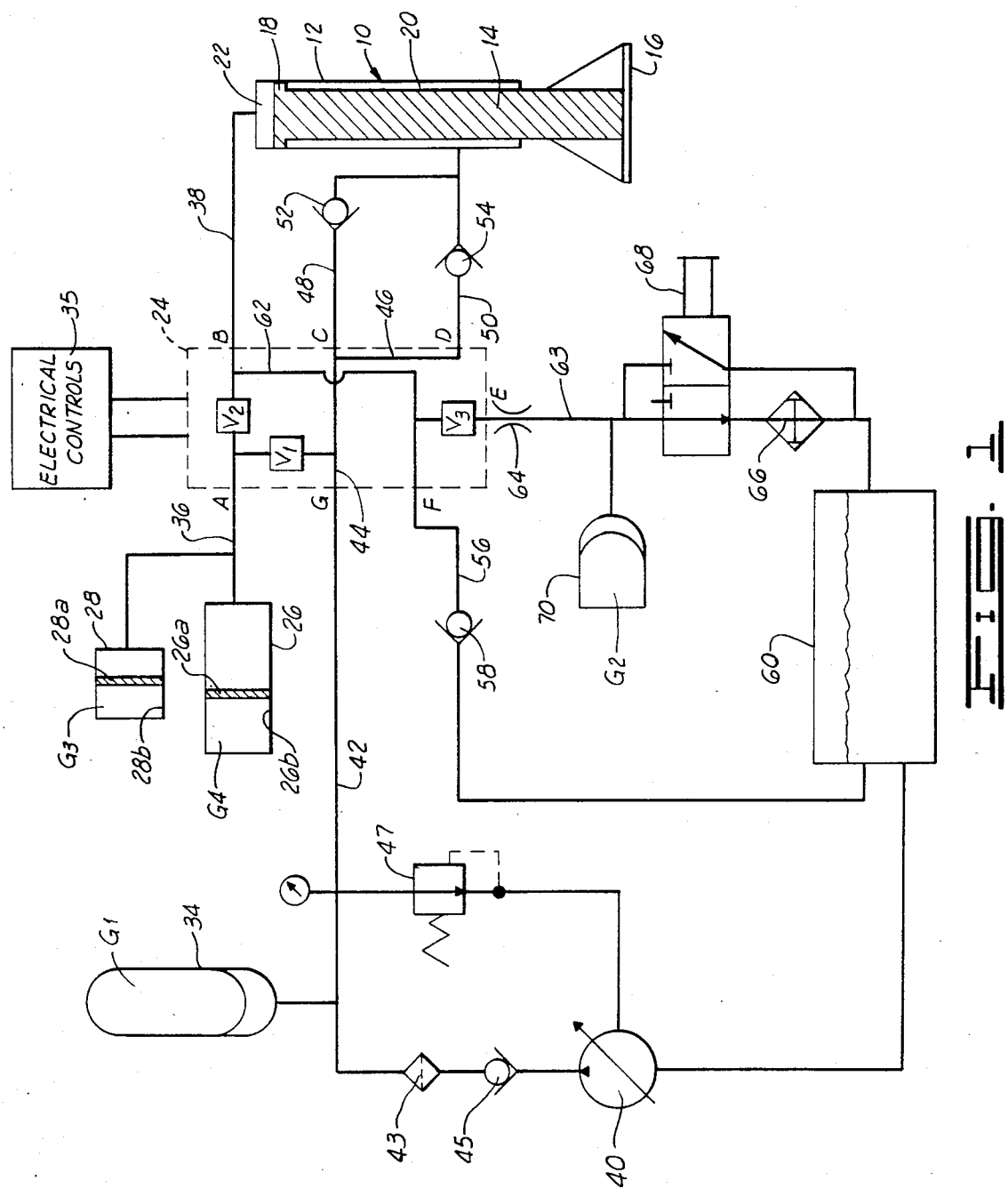
In FIG. 1, an overall system embodying the present invention is illustrated; and In FIGS. 2 (A-D) are schematic illustrations of sequential and functional positions of the seismic impulse generating means in various operating positions.

Referring now to FIG. 1, a hydraulically controlled ram cylinder 12 slidably and sealingly receives a ram member 14. The ram member 14, as illustrated, is attached at its lower end to a rectangularly shaped base plate 16, the base plate 16 being perpendicular to the longitudinal axis of the ram member 14. The ram member 14 is movable between an upper position, as shown, to a lower position in an impact relationship to an earth's surface. While not shown, the height of the cylinder can be adjusted vertically with respect to an earth3 s surface to vary the input seismic force or impact of the base plate to the earth formations.

The upper end of the ram member 14 has a ram piston 18 which is slidably and sealingly received in the ram cylinder 12. The body of the ram member 14 below the ram piston 18 is cylindrically shaped and smaller in diameter than the diameter of the ram piston 18 and the lower end of the ram member 14 passes through an opening or bore in the lower end of the ram cylinder 12. Thus, an annular chamber 20 is defined between the body of the ram member 14 and the inner wall of the ram cylinder 12 below the ram piston 18. A cylindrical chamber 22 is defined in the ram cylinder between the ram piston 18 and an upper end of the ram cylinder. As will be appreciated, the pressure area of the ram piston 18 in the cylindrical chamber 22 is greater than the pressure area of the body of the ram member 14 thereby providing a differential area so that the ram member 14 can be moved downwardly with equal pressures above and below the ram piston 18.

A closed hydraulic system is provided for accelerating the ram member 14 downwardly between the first and second positions and for providing pressure for returning the ram member 14 from the second position to the first position. The hydraulic system includes a valve means 24 for providing various flow interconnections for the system, a first or primary pressure accumulator 26 for operating the ram member 14 between the first and second positions, a second or secondary pressure accumulator 28 for providing a quick return for the ram member 14 from the second position and a third or system pressure accumulator 34 for providing pressure for return of the ram member 14 to the first position.

In the valve means 24 are solenoid operated valves $V_1$, $V_2$, and $V_3$. Electronic controls 35 are provided to open or close the valves in a desired sequence.

A pump 40 is connected by a flow conduit 42 to internal valve flow conduits 44 and 46 in the valve means 24 which respectively connect to flow conduits 48 and 50. The pump may be a varible displacement pressure compensated piston type. The flow conduit 48 includes a one way check valve 52 which permits flow in a forward direction from the valve means 24 to the annular chamber 20 in the ram cylinder 12. The flow conduit 50 includes a one way check valve 54 which permits flow in a reverse direction from the annular chamber 20 to the valve means 24. As illustrated, the valve $V_2$ is connected to the first and second accumulators 26 and 28 by a flow conduit 36 and to the cylinder chamber 22 by a flow conduit 38. A filter 43 and one-way valve 45 are located in the flow conduit 42. A variable control means 47 are provided for regulation of pump speed and hence pump pressure to develop the system pressure. The valve $V_1$ interconnects the flow conduit 36 to the internal flow conduit 44. A flow conduit 56 connects through a one-way valve 58 to a reservoir 60 and is also connected to the flow conduit 38 by an internal conduit 62. The valve $V_3$ connects the internal flow conduit 62 to the pressure tight reservoir 60 by a flow conduit 63.

A fluid return to the reservoir 60 is provided by the flow conduit 63 which has a back pressure choke 64 and cooler means 66 for cooling the hydraulic fluid. A bypass valve 68 can be used to bypass the cooler means 66 when cooling of the hydraulic fluid is not necessary. A damping accumulator 70 is coupled to the flow conduit 62.

The damping accumulator 70 as well as the system accumulator 34 are bladder type accumulators containing an enclosed charge of gas $G_1$ and $G_2$ under pressure (such as Nitrogen) where expansion and compressipn of the gas occurs when fluid pressure is applied or removed to an access opening in one end of an accumulator. For reasons which will be apparent later, the gas pressure of a charge of gas $G_2$ is at pressure value which is less than the range of system pressures employed.

The first and second accumulators 26 and 28 are piston types which have piston members 26a and 28a respectively slidably and sealing by received in cylinders 26b and 28b. A charge of gas $G_3$ and $G_4$, such as Nitrogen, in a gas filled chamber acts on the respective pistons to normally urge the pistons toward an access opening in one end of a cylinder. The charge of gas $G_4$ in the first accumulator 26 is at a pressure value which is in the same pressure range as the gas pressure $G_1$. The pressure of $G_2$ is, for example, 15 psi and the pressure of $G_3$ is, for example, 150 psi. The first accumulator 26 is sized to receive a volume of fluid in the cylinder 26b which is equal to the volume of the cylindrical chamber 22 when the ram member is in a first location just above the ground surface. That is, the volume of fluid in the first accumulator 26 at a system pressure is equal to the volume of oil required to move the ram member 14 to a position where the face plate 16 is about *1* inch off the ground. Note that in this condition the ram member 14 still has some remaining travel stroke and that the accumulator piston 26a will be bottomed out in the accumulator cylinder 26b.

In operation, valves $V_1$ and $V_3$ are operated conjunctively. In a start condition, valves $V_1$ and $V_3$ are opened and valve $V_2$ is closed. The pump provides fluid under pressure to the open ends of the first and second ram accumulators 26 and 28 via the flow conduit 42, the valve $V_1$ and the flow conduit 36. Fluid under pressure is also supplied to the annular chamber 20 in the ram cylinder 12 via the flow conduit 48 and the one-way valve 52. The open end of the third accumulator 34 is also supplied fluid under pressure from the pump 40. As an example, the gas pressure in the gas chambers of first and third accumulators 26 and 34 can be 2300 psi. Under these conditions the pump provides a system pressure greater than 2300 psi so that the ram member 14 is positioned in the first upper position and the gas pressures of the gas $G_1$ and $G_4$ in the first and third accumulators 26 and 34 are compressed to the value of the system pressure. The gas $G_3$ in the second ram accumulator 28 also is compressed to the system pressure.

After a system pressure has been obtained, the valves $V_1$ and $V_3$ are closed prior to commencing the seismic operation. At, for example, 200 milliseconds after the valves $V_1$ and $V_3$ are closed, the valve $V_2$ is opened. When the valve $V_2$ is opened, the compressed gas under system pressure in the accumulator 26 moves the volume of fluid in the first ram accumulator 26 into the cylinder chamber 22 to accelerate the ram member downwardly. The differential pressure area between the ram piston 18 and the area of the ram member 14 is about 4 to 1 so that the ram member 14 is accelerated downwardly to impact the ground surface in about, for example, 150 milliseconds. At about one inch above the ground level, the volume of fluid in the first accumulator 26 is now transferred into the ram cylinder 12 and the accumulator piston 26a bottoms out in the accumulator cylinder 26b. Additional "make up" fluid is supplied from the second accumulator 28. Also, if necessary, make up fluid can be obtained from the reservoir 60 via conduits 56 and 62 to maintain fluid above the piston 18 as the ram member 14 travels toward impact and compression of the earth's surface. As fluid is drawn from the secondary accumulator 28, the accumulator piston 28a travels toward the open end of the accumulator 28 so that the pressure in the accumulator 28 is substantially reduced. Subsequent to impact and with deceleration of the ram member 14, the energy in the compressed earth formations is substantially greater than the gas pressure in the second accumulator 28 so that the second accumulator 28 receives or absorbs the energy from the earth formation and permits the ram member 14 to accelerate in an upward direction. Since the system accumulator 34 has an increased pressure greater than the system pressure it conjunctively applies pressure in the annulus 20 in the ram cylinder 12 to continue the upward movement of the ram member 14 from the second position toward the first position. At about, for example, 800 milliseconds, shortly after the base plate 16 leaves contact with the ground, the valve $V_2$ is closed. Thereafter, valves $V_1$ and $V_3$ are opened and the first and second accumulators 26 and 28 are recharged as necessary by the pump to the system pressure. Any hydraulic fluid in cylinder chamber 22 is directed via conduit 63 to the reservoir as the ram member 14 returns to its first position.

Figure 2:
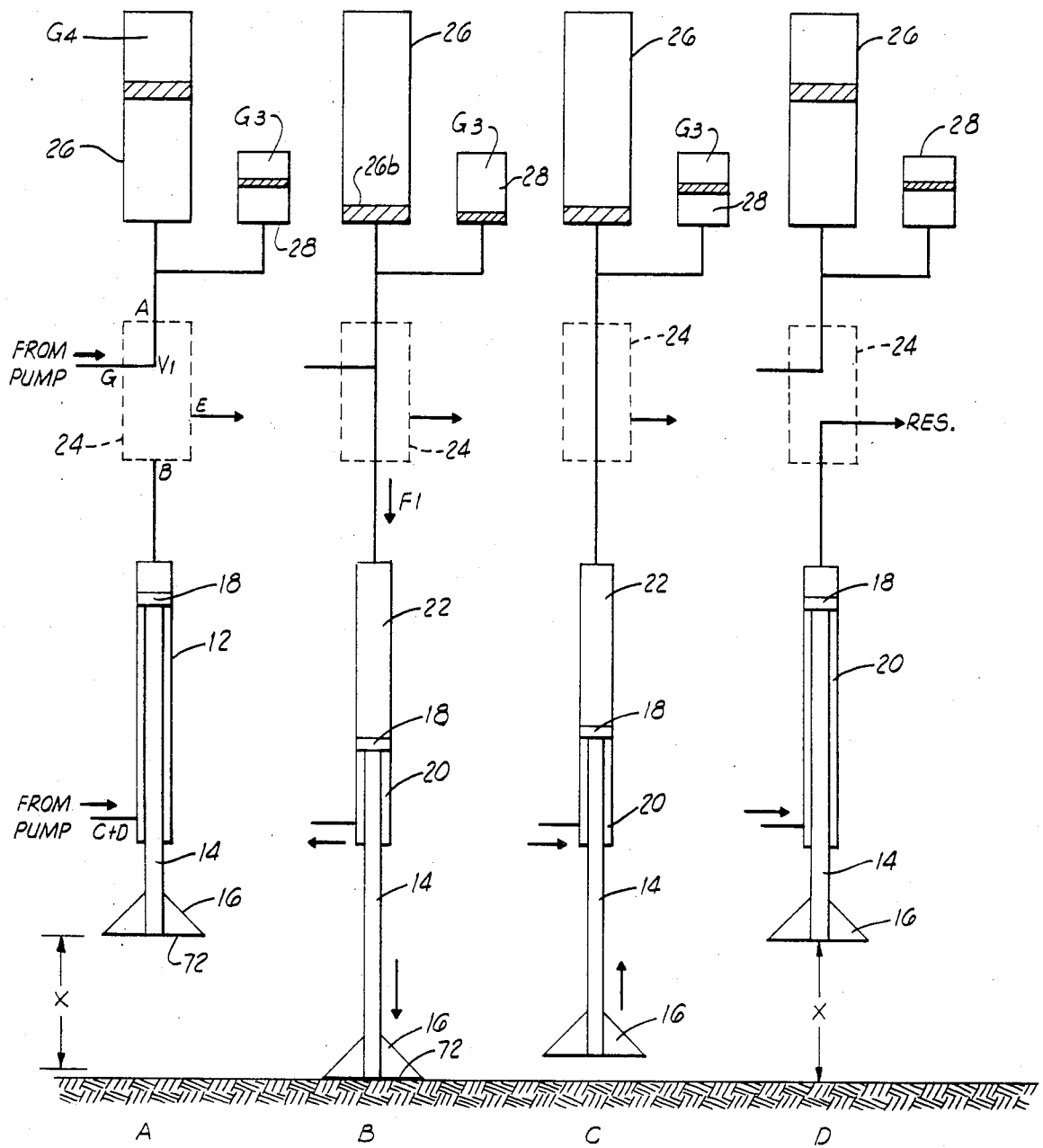

The overall interrelationship and operation of the system may best be understood by reference to FIG. 2A–2D. In an initial condition as shown in FIG. 2A, a bottom surface 72 of the base plate 16 is located a predetermined distance X above the surface of the ground. As will be more fully explained hereafter, the distance "X" is a function of the desired foot pound force to be applied to the ground when the piston 26a in the primary accumulator 26 bottoms out or is stopped in its travel and therefor delivers all of the gas energy in the accumulator 26 to the fluid. However in the initial stage shown in FIG. 2A, the pump delivers fluid under pressure via an open valve $V_1$ to compress the gas $G_4$ and $G_3$ in the primary and secondary cylinders 26 and 28 thereby storing energy in compressed gas in the accumulators 26 and 28. At this time the ram member 14 is in its upmost position in the ram cylinder 12 by means of pressure being applied to chamber 20. With reference to FIG. 1, this condition is achieved when the valves V1 and V3 are open and valve V2 is closed.

Upon reaching the system pressure for operation, the valves V1 and V3 are closed and the valve V2 is open. As shown in FIG. 2B, stored energy in the compressed gas in the primary accumulator 26 is applied to the fluid to move the piston 18 and accelerate the ram member 14 in a downward direction. Fluid in the cylinder annulus 20 is by-passed by the check valve 54 to the system accumulator 34 to create stored energy in the system accumulator 34. As shown in FIG. 2B, when the base member 16 impacts with the ground surface it continues downwardly compressing the earth formation and creating reaction energy. The spacing "X" is adjusted relative to the stroke of the piston 26b in the primary accumulator 26 so that the piston 26b in the primary accumulator bottoms out, preferably when the bottom surface 72 is about 1 inch above ground level. The downward travel of the ram member 14 beyond the distance X causes the piston 28a in the secondary accumulator to move toward the open end of the accumulator 28.

When the base member 16 compresses the earth formation to the full extent of its downwardly applied energy, the reaction energy in the compressed earth formation moves the base member 16 upwardly as shown in FIG. 2C. This upward movement occurs rapidly since the gas pressure of the gas $G_3$ in the secondary accumulator 26 is at a relatively low value thereby permitting a quick upward motion of the ram member 14 and fluid flows from the ram cylinder chamber 22 into the secondary accumulator 28. Thereupon, the pressure in the system accumulator 34 acts through one way valve 52 to apply fluid to the annulus 20 under pressure and return the ram member 14 to its initial position under the pressure provided by the system accumulator.

At, for example, 800 milliseconds thereafter, as shown in FIG. 2D, the valve $V_2$ is closed and the valves $V_1$ and $V_3$ are opened so that the system is recharged for the next operation. Hydraulic oil in cylinder chamber 22 is returned to the reservoir 60.

As discussed before, by adjusting the height of the ram cylinder 12 or the base plate 16 relative to the ground surface and adjusting the system pressure, the power output to the ground can be varied. Thus increasing the distance X of the base plate from the ground and increasing the system pressure will increase the power output.

It will be apparent to those skilled in the art that various changes may be made in the invention without departing from the spirit and scope thereof and therefore the invention is not limited by that which is enclosed in the drawings and specifications but only as indicated in the appended claims.

What is claimed is:

1. A hyraulically actuated seismic energy apparatus for producing as single impact with the surface of the earth, including:

hyraulic means including a ram cylinder adapted to be vertically disposed above the surface of the earth, and a ram member movable relative to said ram cylinder in response in response to fluid under pressure between a first upper position and a second lower position where said ram member has face plate and impacts and compresses the earth in said lower position;

first pressure responsive means coupled to said ram cylinder for providing a defined volume of fluid at a first actuation pressure to said ram member for accelerating said ram member in a downward direction between said first and second positions until the face plate of the ram member is in proximate spaced relationship to the surface of the earth; and second pressure responsive means coupled to said first pressure responsive means for providing a low pressure fluid chamber to receive return of fluid from said cylinder when a reaction force in the compressed earth overcomes the downward acceleration forces of the ram member at said lower position thereby accelerate said ram member in an upward direction from said lower position toward said upper position.

2. The apparatus as defined in claim 1 and further including:

fluid in said hydraulic means which is displaced by said ram member during movement between said first and second positions; and third responsive means coupled to said ram cylinder for providing a return pressure to said fluid displaced from said ram cylinder by downward movement of said ram member where said return pressure is applied to said ram cylinder and said ram member after transfer of said defined volume of fluid to said ram cylinder for moving said ram member from said second position to said first position.

3. The apparatus as set forth in claim 2 and further including first valve means coupled to said first pressure responsive means and said second pressure responsive means and to said ram cylinder for controlling the initiation of flow of fluid to said ram cylinder to move said ram member between said first and second positions, said valve means further including a flow path means between the ram cylinder and said third pressure responsive means for directing the flow of fluid to said third pressure responsive means.

4. The apparatus as set forth in claim 3 characterized further to include:

a supply reservoir; and wherein said valve means includes a valve controlled flow path between the ram cylinder and the supply reservoir for the flow of fluid from the ram cylinder to the supply reservoir during a portion of the movement of the ram from the second to the first position.

5. A hydraulically actuated seismic energy apparatus for producing a single impact with the surface of the earth, including:

hydraulic means including a ram cylinder adapted to be vertically disposed above the surface of the earth, and a ram member movable relative to said ram cylinder in response to fluid under pressure between a first upper position and a second lower position where said ram member has a face plate and impacts and compresses the earth in said lower position and where said ram member displaces fluid in said ram cylinder during the movement between said first and second positions;

first pressure accumulator means coupled to said ram cylinder for providing a defined volume of fluid at a first actuation pressure to said ram member for accelerating said ram member in a downward direction between said first and second positions until a defined volume of fluid is transferred to said ram cylinder to locate the face plate of the ram member in spaced proximate relationship to the surface of the earth;

second pressure accumulator means coupled to said first accumulator means for providing a low pressure fluid chamber to receive return of fluid from said ram cylinder when a reaction force in the compressed earth overcomes the downward acceleration forces of the ram member thereby to accelerate said ram member in an upward direction;

third pressure accumulator means coupled to said ram cylinder and responsive to the downward acceleration of said ram member for developing a return pressure to the fluid displaced from said ram cylinder by downward movement of said ram member whereby said return pressure is applied to said ram cylinder and said ram member after transfer of said defined volume of fluid to said ram cylinder for moving said ram member from said second position to said first position;

pump means for providing fluid under pressure to said pressure accumulator means to a system pressure value;

flow conduit means for coupling said pump means to said pressure accumulator means;

valve means in said flow conduit means for selectively connecting said pump means to said first and second pressure accumulator means while isolating said first accumulator means from said ram cylinder and for isolating said first and second pressure accumulator means from said pump means while connecting said first and second accumulator means to said ram cylinder.

6. The apparatus as defined in claim 5 wherein said first and second pressure accumulator means are cylinders containing slidable pistons and respectively contain a gas charge at predetermined pressure values.

7. The apparatus as defined in claim 6 wherein said third pressure accumulator means is a cylinder containing a flexible bladder member and contains a gas charge at a predetermined pressure value.

8. The apparatus as defined in claim 5 and further including a reservoir means coupled to said valve means where said valve means is selectively operative to connect said ram cylinder to said reservoir means while said first and second accumulator means are disconnected from said ram cylinder.

9. A method for hydraulically accelerating a seismic energy ram member slidably and sealingly disposed in a vertical ram cylinder between a first upper position above a ground surface and a second lower position of impact and compression of earth formation below a ground surface and accelerating the initial upward return movement of said ram member to a first upper position including the steps of:

storing a defined system pressure on a fluid in first, second and third pressure accumulators whereby said first and third pressure accumulators have a positive pressure output to the fluid and said second pressure accumulator has lesser pressure output to the fluid;

applying said positive prssure output of the fluid in said first accumulator to the ram member in the ram cylinder for accelerating said ram member from a first upper position toward a second lower position with a defined volume of fluid from said first accumulator to where said ram member is located proximate to the earth's surface;

during the movement of said ram member between said first and second positions, supplying fluid displaced by said ram member to said third accumulator for increasing the positive pressure output of said third accumlator;

upon completion of the transfer of said defined volume of fluid into the ram cylinder, removing fluid form said second pressure accumulator so that upon impact of said ram member with an earth formation and compression of an earth formation, the response of the reaction force of the earth formations can overcome the downward force of the ram member and accelerate the ram member upwardly from the earth formation by displacing a portion of the fluid in the ram cylinder to said second pressure accumlator; and applying the increased positive pressure accumulator; and applying the increased positive pressure output from said third accumulator to said ram member for moving the ram member upwardly.

* * * * *

UNITED STATES PATENT AND TRADEMARK OFFICE
CERTIFICATE OF CORRECTION

PATENT NO. : 4,700,804
DATED : Oct. 20, 1987
INVENTOR(S) : Curtis A. Trudeau

It is certified that error appears in the above-identified patent and that said Letters Patent is hereby corrected as shown below:

Col. 3, line 6, "earth3 s" should be --earth's--.

Col. 6, line 39, "hyraulically" should be --hydraulically--.

Col. 6, line 42, "hyraulic" should be --hydraulic--.

Signed and Sealed this

Twenty-fifth Day of October, 1988

Attest:

DONALD J. QUIGG

Attesting Officer

Commissioner of Patents and Trademarks